US012678960B2

(12) United States Patent
Kuang et al.

(10) Patent No.: US 12,678,960 B2
(45) Date of Patent: Jul. 14, 2026

(54) SYSTEMS AND METHODS FOR ROBOTIC TELEOPERATION INTENTION ESTIMATION

(71) Applicant: Honda Motor Co., Ltd., Tokyo (JP)

(72) Inventors: Lijing Kuang, La Jolla, CA (US); Songpo Li, San Jose, CA (US); Soshi Iba, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 18/806,621

(22) Filed: Aug. 15, 2024

(65) Prior Publication Data

US 2025/0091214 A1 Mar. 20, 2025

Related U.S. Application Data

(60) Provisional application No. 63/584,070, filed on Sep. 20, 2023.

(51) Int. Cl.
*B25J 9/16* (2006.01)

(52) U.S. Cl.
CPC ................................... *B25J 9/1689* (2013.01)

(58) Field of Classification Search
CPC ......... B25J 9/1689; B25J 9/163; B25J 9/1697
See application file for complete search history.

(56) References Cited

U.S. PATENT DOCUMENTS 12,444,411 B1 * 10/2025 Derezhenets ....... G10L 15/1822
12,499,879 B1 * 12/2025 Soliman ................ G06F 40/295

2009/0088634 A1 * 4/2009 Zhao .................. A61B 1/00193
600/425
2018/0064499 A1 * 3/2018 Itkowitz ................ B25J 19/023
2019/0201047 A1 * 7/2019 Yates ..................... H04N 7/183
(Continued)

FOREIGN PATENT DOCUMENTS

CN 107097227 A * 8/2017 ....... G06F 18/24155
CN 108527370 A * 9/2019 ............ B25J 9/1605
CN 110605714 A * 12/2019 ............ B25J 9/1664

OTHER PUBLICATIONS

CN-107097227-A translation (Year: 2017).*
(Continued)

*Primary Examiner* — Kyle T Johnson
(74) *Attorney, Agent, or Firm* — Rankin, Hill & Clark LLP

(57) ABSTRACT

Systems and methods for robotic teleoperation are provided. The system receives motion input and gaze data of a human operator performing a robotic teleoperation task, and a plurality of features are extracted from the received data. A recurrent neural network determines latent actions from the extracted features and generates temporally associated action inferences. A model determines inferred intention from a sequenced pair of action inferences, an intention hierarchy, and a probabilistic uncertainty function. A tele-operated robotic element performs a task associated with the inferred intention without a corresponding control signal from the human operator. The recurrent neural network is trained using extracted features and contrastive learning. The intention hierarchy is generated from action inferences. The probabilistic uncertainty function is generated using Bayesian hierarchical modeling. The system and method improves robotic teleoperation by estimating the intention of the human operator.

20 Claims, 7 Drawing Sheets

(56) References Cited

U.S. PATENT DOCUMENTS

| | | | |
|---|---|---|---|
| 2021/0146531 A1* | 5/2021 | Tremblay | G06N 3/084 |
| 2021/0170590 A1* | 6/2021 | Laftchiev | B25J 9/163 |
| 2022/0258351 A1* | 8/2022 | Thackston | G05D 1/0038 |
| 2022/0331973 A1* | 10/2022 | Taniguchi | G16H 40/67 |
| 2023/0148120 A1* | 5/2023 | Kranski | G06N 3/008 |
| | | | 706/14 |
| 2025/0001605 A1* | 1/2025 | Felip | B25J 9/1679 |
| 2025/0083325 A1* | 3/2025 | Cai | G05B 13/027 |
| 2025/0091214 A1* | 3/2025 | Kuang | B25J 9/163 |
| 2025/0108512 A1* | 4/2025 | Lima | G06F 3/011 |
| 2025/0217114 A1* | 7/2025 | Roper, Jr. | G06N 3/02 |
| 2025/0375891 A1* | 12/2025 | Wen | B25J 9/1697 |
| 2026/0028045 A1* | 1/2026 | Bagnell | B60W 60/0011 |

OTHER PUBLICATIONS

CN-108527370-A translation (Year: 2018).*
CN-110605714-A translation (Year: 2019).*
Duarte_Action_Alignment_from_Gaze_Cues_in_Human-Human_and_Human-Robot_Interaction_ECCVW_2018_paper (Year: 2018).*
Abi-Farraj, F., Pacchierotti, C., Arenz, O., Neumann, G., and Giordano, P. R. (2019). A haptic shared-control architecture for guided multi-target robotic grasping. IEEE transactions on haptics, 13(2):270-285.
Abi-Farraj, F., Pedemonte, N., and Giordano, P. R. (2016). A visual-based shared control architecture for remote telemanipulation. In 2016 IEEE/RSJ International Conference on Intelligent Robots and Systems (IROS), pp. 4266-4273. IEEE.
Amor, H. B., Neumann, G., Kamthe, S., Kroemer, O., and Peters, J. (2014). Interaction primitives for human-robot cooperation tasks. In 2014 IEEE international conference on robotics and automation (ICRA), pp. 2831-2837. IEEE.
Balachandran, R., Mishra, H., Cappelli, M., Weber, B., Secchi, C., Ott, C., and Albu-Schaeffer, A. (2020). Adaptive authority allocation in shared control of robots using bayesian filters. In 2020 IEEE International Conference on Robotics and Automation (ICRA), pp. 11298-11304. IEEE.
Campbell, J., Stepputtis, S., and Amor, H. B. (2019). Probabilistic multimodal modeling for human-robot interaction tasks. arXiv preprint arXiv:1908.04955.
Carmichael, M. G., Aldini, S., Khonasty, R., Tran, A., Reeks, C., Liu, D., Waldron, K. J., and Dissanayake, G. (2019). The anbot: An intelligent robotic co-worker for industrial abrasive blasting. In 2019 IEEE/RSJ International Conference on Intelligent Robots and Systems (IROS), pp. 8026-8033. IEEE.
Chen, T., Kornblith, S., Norouzi, M., and Hinton, G. (2020). A simple framework for contrastive learning of visual representations. In International conference on machine learning, pp. 1597-1607. PMLR.
K. Darvish, L. Penco, J. Ramos, R. Cisneros, J. Pratt, E. Yoshida, S. Ivaldi, and D. Pucci, "Teleoperation of humanoid robots: A survey," IEEE Transactions on Robotics, 2023.
T. Gao, X. Yao, and D. Chen, "Simcse: Simple contrastive learning of sentence embeddings," arXiv preprint arXiv:2104.08821, 2021.
Hamaya, M., Matsubara, T., Noda, T., Teramae, T., and Morimoto, J. (2017). Learning assistive strategies for exoskeleton robots from user-robot physical interaction. Pattern Recognition Letters, 99:67-76.
K. He, H. Fan, Y. Wu, S. Xie, and R. Girshick, "Momentum contrast for unsupervised visual representation learning," in Proceedings of the IEEE/CVF conference on computer vision and pattern recognition, pp. 9729-9738, 2020.
Huang, Z., Mun, Y.-J., Li, X., Xie, Y., Zhong, N., Liang, W., Geng, J., Chen, T., and Driggs-Campbell, K. (2023). Hierarchical intention tracking for robust human-robot collaboration in industrial assembly tasks. In 2023 IEEE International Conference on Robotics and Automation (ICRA), pp. 9821-9828. IEEE.
S. Jain and B. Argall, "Probabilistic human intent recognition for shared autonomy in assistive robotics," ACM Transactions on Human-Robot Interaction (THRI), vol. 9, No. 1, pp. 1-23, 2019.
Khosla, P., Teterwak, P., Wang, C., Sarna, A., Tian, Y., Isola, P., Maschinot, A., Liu, C., and Krishnan, D. (2020). Supervised contrastive learning. Advances in neural information processing systems, 33:18661-18673.
Koert, D., Pajarinen, J., Schotschneider, A., Trick, S., Rothkopf, C., and Peters, J. (2019). Learning intention aware online adaptation of movement primitives. IEEE Robotics and Automation Letters, 4(4):3719-3726.
Lai, Y., Paul, G., Cui, Y., and Matsubara, T. (2022). User intent estimation during robot learning using physical human robot interaction primitives. Autonomous Robots, 46(2):421-436.
S. Li, M. Bowman, H. Nobarani, and X. Zhang, "Inference of manipulation intent in teleoperation for robotic assistance," Journal of Intelligent & Robotic Systems, vol. 99, pp. 29-43, 2020.
D. P. Losey, C. G. McDonald, E. Battaglia, and M. K. O'Malley, "A review of intent detection, arbitration, and communication aspects of shared control for physical human-robot interaction," Applied Mechanics Reviews, vol. 70, No. 1, p. 010804, 2018.
Murtagh, F. and Contreras, P. (2012). Algorithms for hierarchical clustering: an overview. Wiley Interdisciplinary Reviews: Data Mining and Knowledge Discovery, 2(1):86-97.
Rumelhart, D. E., Hinton, G. E., Williams, R. J., et al. (1985). Learning internal representations by error propagation.
Selvaggio, M., Moccia, R., Ficuciello, F., Siciliano, B., et al. (2019). Haptic-guided shared control for needle grasping optimization in minimally invasive robotic surgery. In 2019 IEEE/RSJ International Conference on Intelligent Robots and Systems (IROS), pp. 3617-3623. IEEE.
Shen, Y., Mo, X., Krisciunas, V., Hanson, D., and Shi, B. E. (2023). Intention estimation via gaze for robot guidance in hierarchical tasks. In Annual Conference on Neural Information Processing Systems, pp. 140-164. PMLR.
Singh, S., Arora, C., and Jawahar, C. (2016). First person action recognition using deep learned descriptors. In Proceedings of the IEEE conference on computer vision and pattern recognition, pp. 2620-2628.
A. Stooke, K. Lee, P. Abbeel, and M. Laskin, "Decoupling representation learning from reinforcement learning," in International Conference on Machine Learning, pp. 9870-9879, PMLR, 2021.
Tanwani, A. K. and Calinon, S. (2017). A generative model for intention recognition and manipulation assistance in teleoperation. In 2017 IEEE/RSJ International Conference on Intelligent Robots and Systems (IROS), pp. 43-50. IEEE.
A. Yan, Z. He, X. Lu, J. Du, E. Chang, A. Gentili, J. McAuley, and C.-N. Hsu, "Weakly supervised contrastive learning for chest x-ray report generation," arXiv preprint arXiv:2109.12242, 2021.
A. Yan, Z. He, J. Li, T. Zhang, and J. McAuley, "Personalized showcases: Generating multi-modal explanations for recommendations," in Proceedings of the 46th International Acm Sigir Conference on Research and Development in Information Retrieval, pp. 2251-2255, 2023.
J. Yang, J. Duan, S. Tran, Y. Xu, S. Chanda, L. Chen, B. Zeng, T. Chilimbi, and J. Huang, "Vision-language pre- training with triple contrastive learning," in Proceedings of the IEEE/CVF Conference on Computer Vision and Pattern Recognition, pp. 15671-15680, 2022.
Zhu, Y., Fusano, K., Aoyama, T., and Hasegawa, Y. (2023). Intention-reflected predictive display for operability improvement of time-delayed teleoperation system. ROBOMECH Journal, 10(1):1-11.

* cited by examiner

300

CAPTURE/RECEIVE HAND MOTION DATA          302

CAPTURE/RECEIVE EYE GAZE DATA          304

EXTRACT FEATURE(S) FROM MOTION DATA AND/OR GAZE DATA          306

Figure 4:
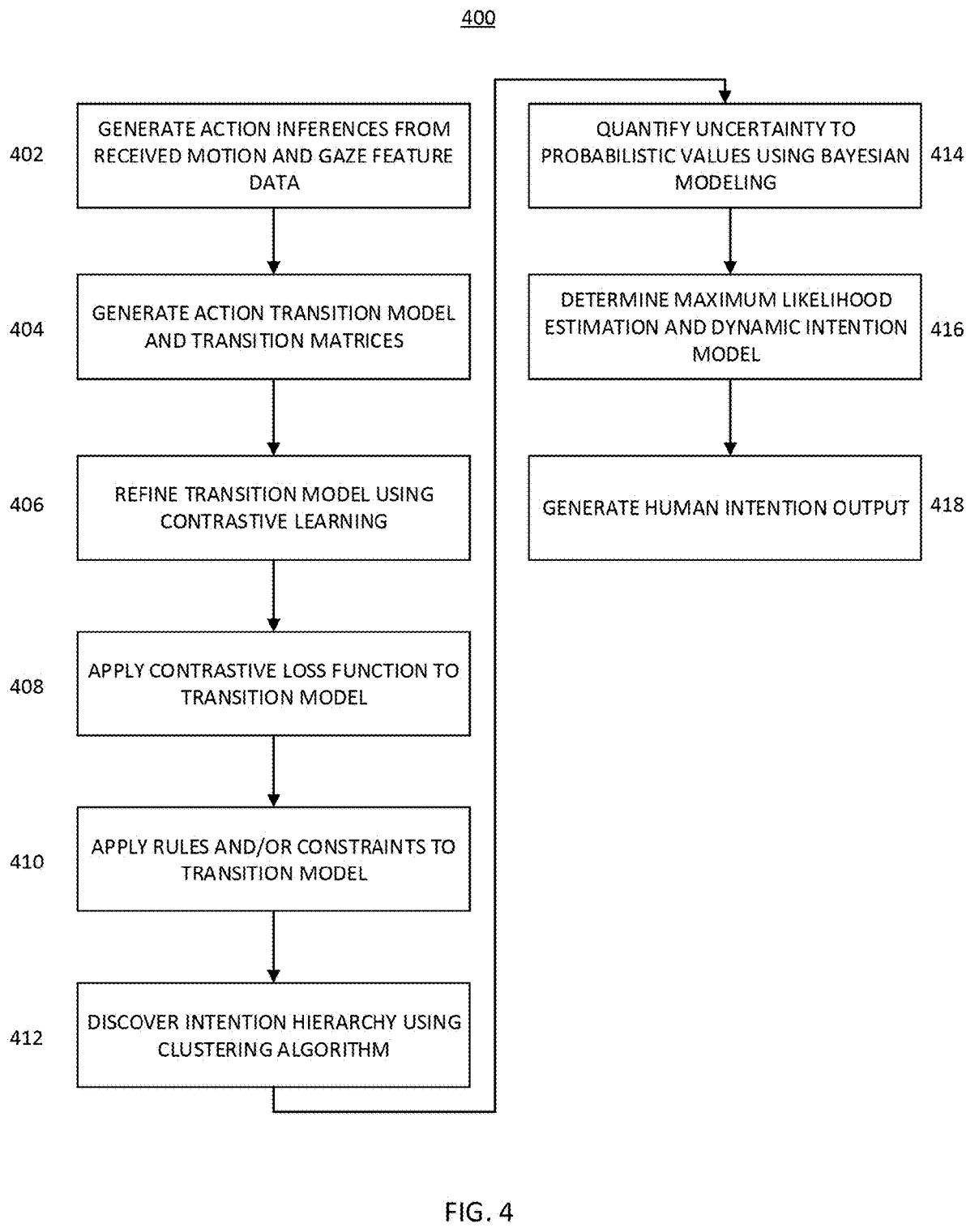

400

| 402 | GENERATE ACTION INFERENCES FROM RECEIVED MOTION AND GAZE FEATURE DATA |

| 404 | GENERATE ACTION TRANSITION MODEL AND TRANSITION MATRICES |

| 406 | REFINE TRANSITION MODEL USING CONTRASTIVE LEARNING |

| 408 | APPLY CONTRASTIVE LOSS FUNCTION TO TRANSITION MODEL |

| 410 | APPLY RULES AND/OR CONSTRAINTS TO TRANSITION MODEL |

| 412 | DISCOVER INTENTION HIERARCHY USING CLUSTERING ALGORITHM |

| 414 | QUANTIFY UNCERTAINTY TO PROBABILISTIC VALUES USING BAYESIAN MODELING |

| 416 | DETERMINE MAXIMUM LIKELIHOOD ESTIMATION AND DYNAMIC INTENTION MODEL |

| 418 | GENERATE HUMAN INTENTION OUTPUT |

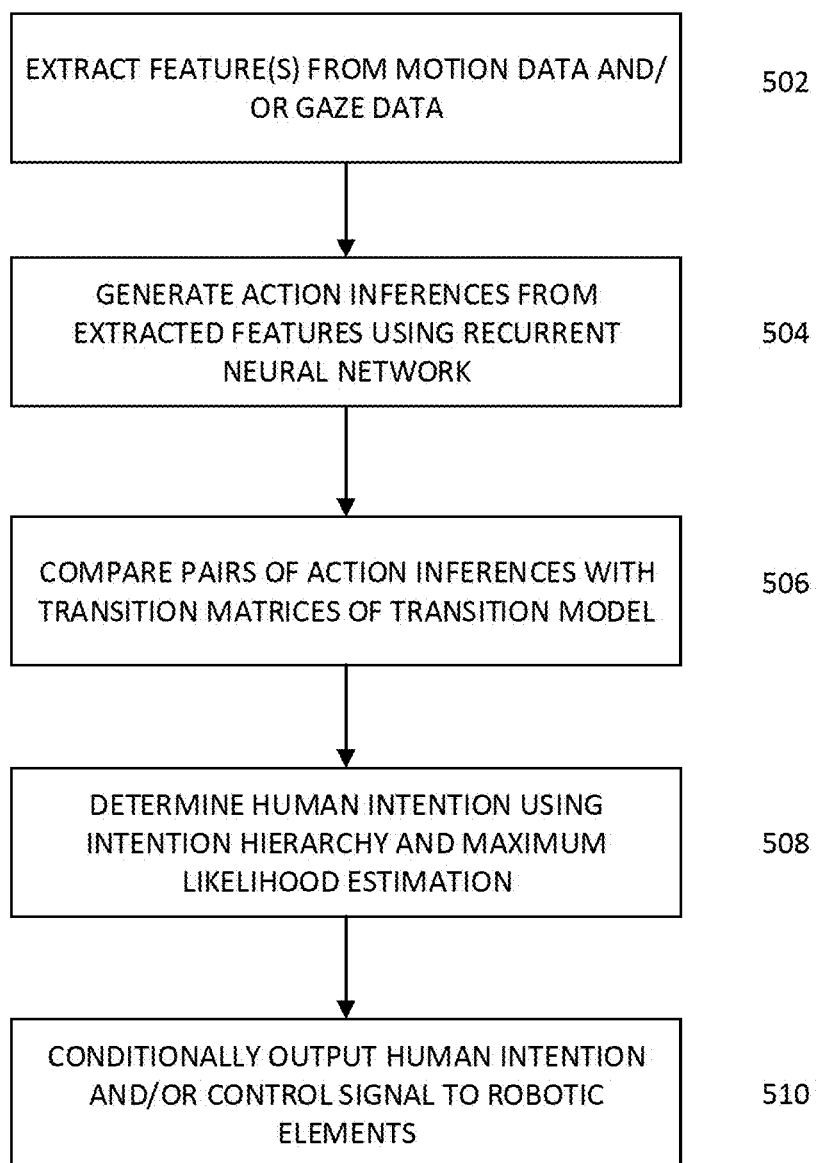

EXTRACT FEATURE(S) FROM MOTION DATA AND/OR GAZE DATA    502

GENERATE ACTION INFERENCES FROM EXTRACTED FEATURES USING RECURRENT NEURAL NETWORK    504

COMPARE PAIRS OF ACTION INFERENCES WITH TRANSITION MATRICES OF TRANSITION MODEL    506

DETERMINE HUMAN INTENTION USING INTENTION HIERARCHY AND MAXIMUM LIKELIHOOD ESTIMATION    508

CONDITIONALLY OUTPUT HUMAN INTENTION AND/OR CONTROL SIGNAL TO ROBOTIC ELEMENTS    510

FIG. 5

SYSTEMS AND METHODS FOR ROBOTIC TELEOPERATION INTENTION ESTIMATION

This application claims the benefit of U.S. provisional patent application Ser. No. 63/584,070, filed Sep. 20, 2023, which is incorporated by reference in its entirety herein.

BACKGROUND

Robotic teleoperation facilitates the performance of many tasks by robotic elements without incurring the time, cost and complexity of setting up fully automated robotic operations. Robotic teleoperation advantageously combines the efficiency of using robotic systems to carry out repetitive structured tasks with the flexibility of human control to problem solve in real-time with real-world constraints. Human-robotic interaction allows human operators to carry out and complete tasks in risky environments where human presence would present an unnecessary risk of death or injury. Human-robotic interaction further allows human operators to carry out and complete tasks in remote locations without having to travel or be physically present in those locations.

Human-robotic interaction is being adopted to assist humans in the performance of task ranging from warehouse management, medical surgeries, underwater operations, nuclear waste removal, and space missions as well as the performance of other labor-intensive or hazardous tasks. Human-robotic interaction has the goal of reducing human workload and improving both productivity and efficiency in labor-intensive and perilous activities. However, challenges to the deployment of teleoperated-enabled robotics include communication delays, difficulties in accurate positioning due to noise and the inherent randomness of real-world conditions, and differences between a human operator's site and the remote environments of the robotic elements.

BRIEF DESCRIPTION

According to one embodiment, a system for robotic teleoperation intention estimation is provided. The system includes a robotic teleoperation input that receives motion inputs and gaze data associated with a human operator performing a robotic teleoperation task. The system includes a feature extractor that analyzes and extracts features from the data. The system includes a neural network that determines latent actions associated with the extracted features and generates corresponding temporally associated action inferences. The system includes a transition model that determines a transition matrix that has data elements associated with a temporally sequenced pair of action inferences. The system includes a dynamic transition model that determines an inferred intention of the human operator; the model includes an intention hierarchy and the determined inferred intention of the human operator is determined least in part based on an estimated probabilistic uncertainty that is applied to the intention hierarchy. The system includes a teleoperated robotic element that performs a task associated with the determined inferred intention of human operator without requiring a corresponding control signal from the human operator. The system may include a recurrent neural network trained with extracted features. The transition model may be refined using contrastive learning, a contrastive loss function, a hierarchical clustering algorithm, or estimated probabilistic uncertainty using Bayesian hierarchical modeling.

According to another embodiment, a method of robotic teleoperation intention estimation is provided. The method includes receiving motion inputs and gaze data associated with a human operator who is performing a robotic teleoperation task. The method includes extracting features from the received data. The method determining, by a neural network, latent actions associated with the extracted features and generating corresponding temporally associated action inferences. The method includes determining a transition matrix that has data elements associated with a temporally sequenced pair of action inferences. The method includes determining an inferred intention of the human operator by a dynamic transition model; the model includes an intention hierarchy and the determined inferred intention of the human operator is determined least in part based on an estimated probabilistic uncertainty that is applied to the intention hierarchy. The method includes performing, by a teleoperated robotic element, a task associated with the determined inferred intention of human operator without requiring a corresponding control signal from the human operator. The method may include training a recurrent neural network with extracted features. The method may include refining a transition model using contrastive learning, a contrastive loss function, a hierarchical clustering algorithm, or estimated probabilistic uncertainty using Bayesian hierarchical modeling.

According to yet another embodiment, a non-transitory computer readable storage medium storing instructions that, when executed by a computer having a processor, cause the computer to perform a method of robotic teleoperation intention estimation. The method includes receiving motion inputs and gaze data associated with a human operator who is performing a robotic teleoperation task. The method includes extracting features from the received data. The method determining, by a neural network, latent actions associated with the extracted features and generating corresponding temporally associated action inferences. The method includes determining a transition matrix that has data elements associated with a temporally sequenced pair of action inferences. The method includes determining an inferred intention of the human operator by a dynamic transition model; the model includes an intention hierarchy and the determined inferred intention of the human operator is determined least in part based on an estimated probabilistic uncertainty that is applied to the intention hierarchy. The method includes performing, by a teleoperated robotic element, a task associated with the determined inferred intention of human operator without requiring a corresponding control signal from the human operator. The method may include training a recurrent neural network with extracted features. The method may include refining a transition model using contrastive learning, a contrastive loss function, a hierarchical clustering algorithm, or estimated probabilistic uncertainty using Bayesian hierarchical modeling.

BRIEF DESCRIPTION OF THE DRAWINGS

FIG. 4 is an exemplary process flow of a method for robotic teleoperation intention estimation, according to one aspect.

FIG. 5 is an exemplary process flow of a method of performing robotic teleoperation using intention estimation, according to one aspect.

DETAILED DESCRIPTION

Figure 1:
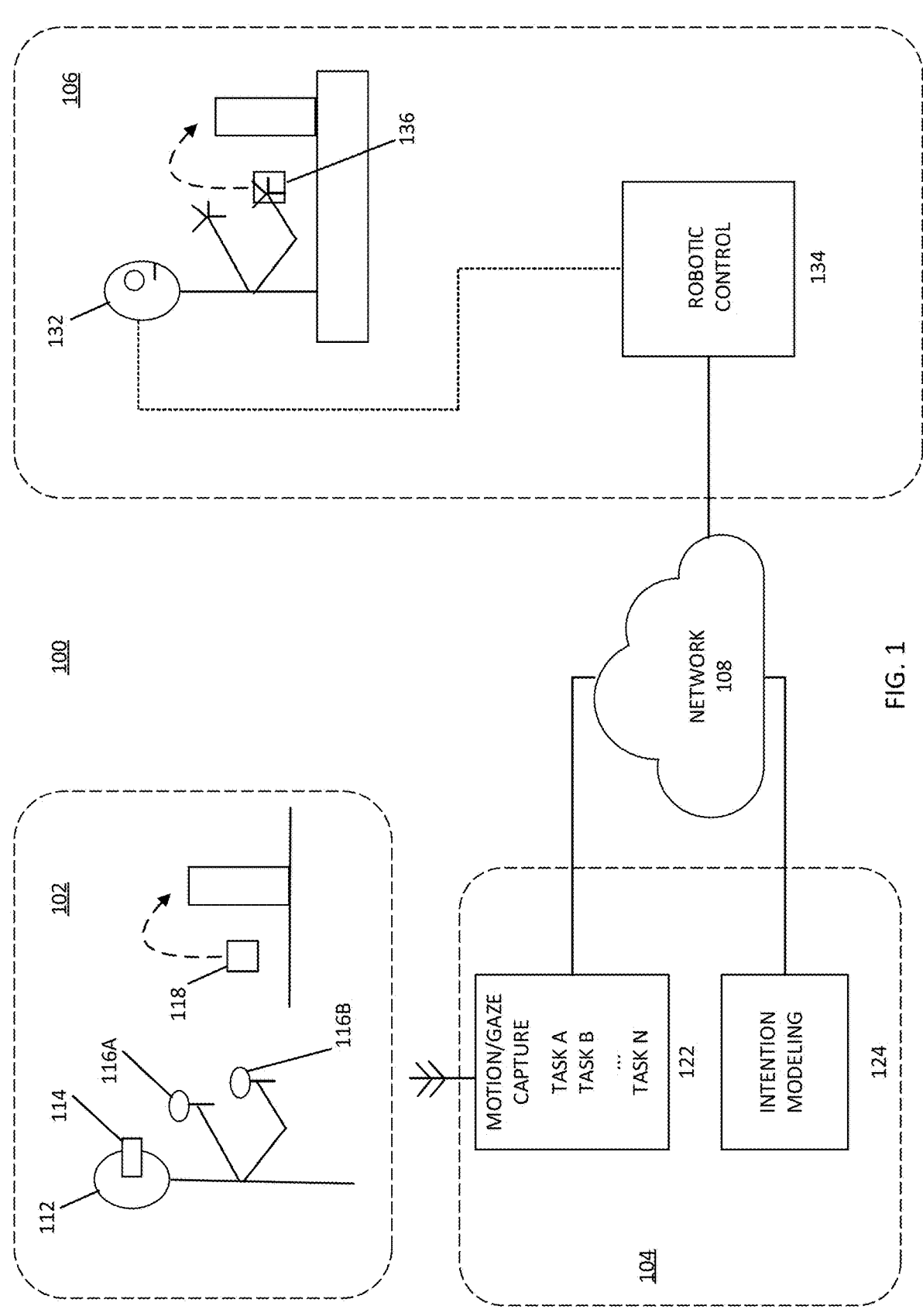
FIG. 1 is an exemplary component diagram of a system for robotic teleoperation intention estimation, according to one aspect.

The systems and methods herein for robotic teleoperation intention estimation provide improvements in the operation and control of robotic systems by human operators. The systems and methods may be used to augment operation and control of a downstream robotic system by a human operator thereby improving operation and control by striking a balance between fully autonomy and pure teleoperation. Teleoperation intention estimation for the operation and control of robotic systems by human operators not only assists in more accurate movement and positioning of robotic elements, but also allows operations to be performed as intended in situations when communication delays temporarily interrupt operator control, preventing stalled or failed time-critical operations. Teleoperation intention estimation also allows operations to be performed as intended where differences between the operator's site and the remote environments would result in mismatches between the operator's intentions and the actual movements carried out by robotic elements. Teleoperation intention estimation further improves operation and control of robotic systems by allowing the human operator to focus on high-level decision-making while the robotic system attends to the kinematic aspects of action execution of the detailed low-level operations.

To address these and other challenges associated with teleoperation of robotic elements, the systems and methods perform teleoperation intention estimation to improve operation of robotic elements in the field. The systems and methods for teleoperation intention estimation perform a structured discovery of intention hierarchy from a human operator's actions and visual gaze during operation of robotic elements. Accurate understanding of human intentions during the performance of a designated task helps to ensure that a remote robot will be able respond rapidly and make reliable inferences about a human operator's intended commands even in the presence of communication delays, noise, and positioning errors. The systems and methods for teleoperation intention estimation perform both low-level and high level estimation of human intention with regard to the operation of the robotic elements.

In one embodiment, one or more first sets of tasks may be employed to train a neural network and model the human operator's control of robotic elements. One or more second sets of tasks also may be employed to validate the effectiveness of the modeling, for example using contrastive learning where different tasks and robotic operations are performed. Contrastive learning may be utilized to encode common patterns of human actions via latent representation, thereby enabling generalization of inference for different human operators. In an embodiment, the neural net is a recurrent neural network (RNN) or other temporal neural network is utilized to capture temporal dependencies of low-level actions, or action inferences, by one or more human operators. Although the present disclosure specifically references the use of RNNs, any suitable neural network, deep learning algorithm, and/or representation learning may be adapted and configured to perform one or more of the operations described herein.

The present system combines a neural network architecture with representation learning. A low-level transition model is generated from the action inferences determined by the neural network and refined by contrastive learning. The low-level transition model captures the likelihood of transitioning from one action to another action. The low-level transition model learns the transition probability using multiple first sets of tasks, which form a dataset of historical teleoperation data, and is further refined using contrastive learning and multiple second sets of tasks.

The low-level transition model includes transition matrices generated from pairs of data, each representing a transition from a first action to a second action. The low-level transition model encodes the relevant information necessary for intention estimation. The first sets of tasks are used to generate first pairs of data which serve as positive sample data. The second set of tasks are used to generate second pairs of data and includes negative sample data. Positive sample data consists of sequences of human motion and gaze data that belong to the same action or low-level intention, whereas the negative sample data includes sequences related to different actions.

The low-level transition model transforms the high dimensional data sequences of human motion and gaze data into a lower-dimensional latent space. Reducing the dimensionality from the original space to a reduced space advantageously reduces computational complexity and increases computational speed and efficiency, thereby facilitating predictions of human intention and enhancing the generalizing ability of the system. The latent representations also maintain interpretability and explainability, allowing the encoded latent features to be correlated back with the original high-dimensional data. This advantageously allows researchers to enhance their understanding of how different actions manifest in the latent space.

The low-level transition model further allows for refining intention estimation by filtering out implausible action sequences. The low-level transition model may be designed to maximize the similarity between different pairs of positive sample data while minimizing the similarity between pairs of positive sample data and negative sample data. In an embodiment, a novel adaptive contrastive loss function adaptively combines cross-entropy loss with contrastive loss to quantify the agreement between the representations of positive pairs of sample data as well as the discrepancies between representations of pairs of positive and negative sample data. Adaptive weights for both types of loss functions may be iteratively learned and adjusted to ensure the best learning performance of the system. A loss function advantageously is able to learn slow features that preserve temporal coherence in general temporal settings.

The latent space encodings enable the system to make conditional predictions about human intentions based on observed data. Maximum likelihood estimation and Bayesian methods may be applied to estimate transition probabilities allowing the system to provide a dynamic transition model that is able to adapt to changes in the robotic teleoperation environment and/or changes in human user behavior over time. While the low-level transition model captures first-order dependencies between actions, the low-level transition model is generalizable to capture higher-order dependencies between actions. For example, if certain actions are more likely to follow a specific sequence of actions, those dependencies can be encoded in a low-level transition model having higher dimensions.

The low-level transition model may be integrated into the action inference process to further refine the results obtained from the neural network based intention estimation. The refinement may include the application of rule-based conditions and/or constraints. Constraints may be defined based on the low-level transition model which includes all valid sequences of actions that may be performed during teleoperation of remote robotic elements.

During the action inference process in the neural network, the output sequences of actions may be subject to defined constraints. If an inferred action sequence violates any predefined constraint, a new inference result may be generated from the last layer of the model until all constraints are fully satisfied. In an online deployment scenario, constraints may be enforced in real-time when a human operator interacts with a remote robotic teleoperated system. If the neural network action inference results in a sequence that contradicts, or is in violation of, one of the constraints, the system may automatically generate a new estimation. By incorporating the low-level transition model with rule-based constraints in the action inference process, the system advantageously may ensure that the inferred intention aligns with expected sequences and transitions, thereby improving the overall reliability of intention estimation throughout the entire interaction between the human operator and the remotely teleoperated robotic elements. Using the low-level transition model, a remote robotic controller may proactively control the remote robotic elements according to the current modeling of human intention which advantageously facilitates robotic teleoperation.

Hierarchical clustering of the inferred action sequences may be used to discover the hidden structure and step-by-step operations of an intention hierarchy. Hierarchical clustering may be used to capture the relationship between goal-directed actions and high-level task objectives. Hierarchical clustering may be executed as an unsupervised operation and does not require predefined hierarchical structures thus eliminating the need for expert knowledge. Uncertainty in the intention hierarchy may be present due to system noise and/or the variability of individual human operator behavior. Bayesian hierarchical modeling may be used to quantify inherent uncertainty in the intention hierarchy into probabilistic results, thereby improving the intention estimation capability of the system. Bayesian hierarchical modeling methods allow models to adapt to changes in the teleoperation environment and changes in human operator behavior.

A dynamic intention model may use the intention hierarchy generated by the hierarchical clustering discovery module while factoring in the generated probabilities of the Bayesian hierarchical modeling to improve determinations of human operator intent. A maximum likelihood determination of human intention may be obtained and used to control remote teleoperated robotic elements.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a machine that moves in or manipulates an environment. Exemplary agents may include, but are not limited to, robots or other machines. The agent may be semi-autonomously or manually operated through remote teleoperation. "Agent system," as used herein may include, but is not limited to, any automatic or manual systems that may be used to enhance the agent, propel the agent, and/or provide for safe operation of the agent.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area Network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to:

keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, and embedded processors. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

I. System Overview

The drawings are for purposes of illustrating one or more exemplary embodiments and not for purposes of limiting the same. FIG. 1 is an exemplary diagram of an operating environment 100 for robotic teleoperation intention estimation, according to one aspect. The operating environment 100 includes a local environment 102, one or more computing devices 104, and a remote robotic environment 106 that are interconnected by a network 108. The elements of the operating environment 100, as well as the components of the systems, hardware architectures, and software architectures discussed herein, may be combined, omitted, or organized into different architectures for various embodiments. The computing devices 104 may be implemented with one or more physical computing devices or implemented using remote computing services.

The local environment 102 may comprise a human operator 112 equipped with an eye gaze capture device 114, one or more hand motion capture devices 116a, 116b (collectively hand motion capture devices 116), and a task platform 118. An example eye gaze capture device 114 is a binocular Tobii eye tracker operating at 120 Hz. The human operator 112 may view the local environment 102 through a human operator interface such as an HTC Vive Pro Eye headset, which may be integrated with the eye gaze capture device 114 as a head mount display. Example hand motion capture devices 116 may include Oculus hand controllers The elements of the local environment 102 are in communication with a computing device 104 such as operation capture computing device 122 which is suitably configured for capturing data associated with the capture devices 114, 116. The eye gaze capture device 114 may capture eye gaze data of the human operator 112 and transmit the eye gaze data in real-time to the operation capture computing device 122. The eye gaze capture device 114 may transmit the eye gaze data wireless as shown, or by a wired connection (not shown.) Similarly, the hand motion capture devices 116 may capture and transmit hand motion data wirelessly or by wired communications. In an embodiment, the task platform 118 may provide data to the operation capture computing devices 122 about the movement of items associated with the task platform 118 and operations performed by the human operator 112.

The computing devices 104 may include the operation capture computing device 122 that receives the eye gaze data and hand motion data, and an intention estimation computing device 124 that generates intention estimation data as described below in greater detail. The computing devices 104 may be locally connected or connected via a network 108 such as a LAN or WAN. In an embodiment, the operation capture computing device 122 and intention estimation computing device 124 may reside on the same computing platform or computing device.

The remote robotic environment 106 includes one or more robotic devices 132, a robotic controller 134, and a robotic task 136 that is to be operated or performed. The robotic device 132 is operably controlled or directed by the robotic controller 134, which may be integrated into the robotic device 132. The robotic device 132 may be implemented as a part of an agent. The agent may be a robotic arm, a bipedal robot, a two-wheeled or four-wheeled robot, a vehicle, a self-propelled machine, or may be integrated with a special purpose machine for accomplishing a dedicated task, such as a medical device or industrial machinery. The agent may be configured as a humanoid robot. The humanoid robot may take the form of all or a portion of a robot. For example, the humanoid robot may take the form of an arm coupled to a hand with fingers. In other embodiments, the components and functions of the robotic device 132 may be implemented, for example, with other devices such as machines or devices associated with the robotic task 136 and connected via a network (e.g., the network 108). The robotic controller 134 may be a computing device 104 and may be capable of providing wired or wireless computer communications utilizing various protocols to send/receive electronic signals internally to/from components of the remote robotic environment 106. Additionally, the robotic controller 134 may be operably connected for internal computer communications via a bus (e.g., a Controller Area Network (CAN) or a Local Interconnect Network (LIN) protocol bus) to facilitate data input and output between the robotic controller 134 and other components of the operating environment 100.

Figure 2:
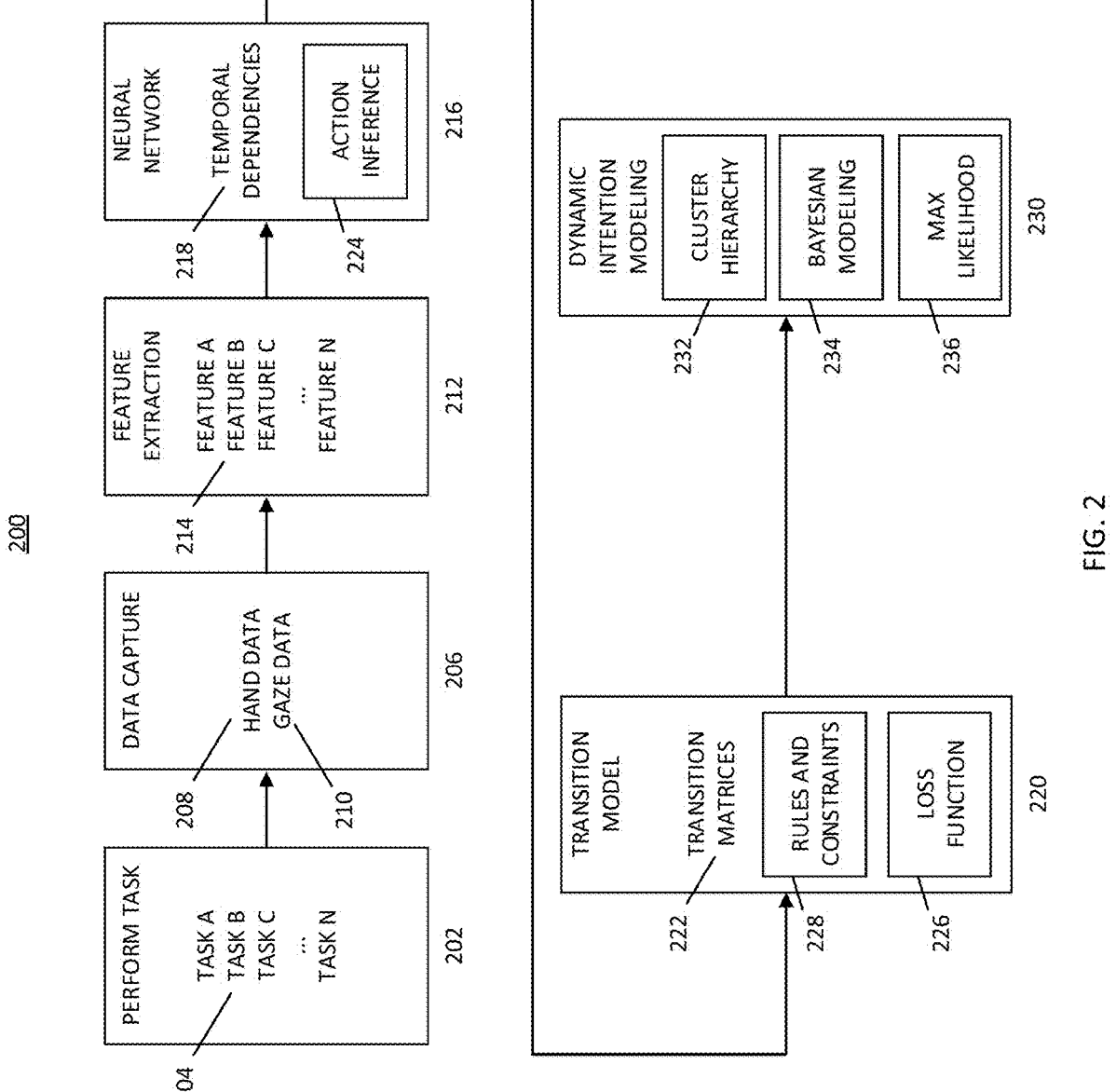
FIG. 2 is an exemplary process flow of robotic teleoperation intention estimation, according to one aspect.

FIG. 2 is an exemplary diagram of training processes 200 for generating robotic teleoperation intention estimation, according to one aspect. At block 202, a human operator performs a first sequence of training tasks 204 associated with the operations intended to be carried out by the remote robotic device. The sequence of tasks 204 depend on the intended robotic operation. In a simplified example, the tasks 204 may begin with the human operator grasping a first block, translating the first block above a second block, and resting the first block on the second block, before performing other subsequent tasks. One or more training sessions may include real-world operations of robotic elements. One or more training sessions may be simulations designed to train the system.

In an embodiment, one or more additional sequences of training tasks 204 may be carried out by a second human operator. The additional sequences of training tasks 204 provide additional positive data for training the system. In the context of human teleoperation of robotic elements, different human operators may exhibit variability in the performance of tasks for controlling robotic devices. By including data from multiple human operators, the system, once properly trained, is able to generalize across different operators and capture the underlying structure of actions for the tasks to be performed by the remote robotic device.

In an embodiment, a human operator performs a second sequence of training tasks 204 that are not associated with the operations intended to be carried out by the remote robotic device, or at least not identically associated with the operations. The second sequence of training tasks 204 provide negative data that may be used to refine a transition model using, for example, contrastive learning as described with regard to block 216 and the accompanying detailed description. The negative data may include sequences of actions that are different from the actions associated with the first sequence of training tasks 204.

At block 206, motion data 208 and gaze data 210 associated with the human operator's actions are captured during the performance of the sequence of tasks 204. Motion data 208 is captured to track the movement of the human operator's hands. Gaze data 210 is captured to track the direction of the human operator's gaze. Both motion data 208 and gaze data 210 are captured while the human operator operates the controls of the robotic system which may include movements of actual elements of the robotic system. Motion data 208 and gaze data 210 may be acquired using any suitable technology including but not limited to commercially available or custom designed head-worn or eye-based gear adorned by operators, hand-held controllers complemented with accelerometers, internal or external cameras or image capturing devices, position encoders, LED or strobe-based 3-D position determining systems, and so forth.

During training operations, the robotic system may be positioned in close proximity to the operator's controls to ensure there is no, or minimal, communication delay. The motion data 208 and gaze data 210 associated with the operator's hands and eyes (and/or head) respectively provide the basis for the intention estimation architecture to generate the semantic latent representation of low-level human intentions. The operator's hands and the operator's gaze are secondary human behaviors that provide complementary information for determination of the intention estimation. Secondary human behaviors may be complementary to control signals transmitted to the robotic elements to cause movement and other actions by robotic elements.

At block 212, features 214 are extracted from the raw motion data 208 and gaze data 210. Example features 214 may be for example, video clips or other data showing just the portions where the human operator's gaze moved from training object A to training object B on the task platform, while the human operator's left hand grasped training object A, translated training object A positively in both the y-axis and z-axis above training object B, translated training object A negatively in the z-axis until training object A contacted training object B, and released training object B. In an embodiment, the features 214 may be extracted using a suitable pre-processing algorithm or neural network, which may include the neural network 218 described with regard to block 216.

At block 216, the features 214 are input into a neural network 218 that determines suitable descriptive indicia along with temporal relationships and dependencies of the tasks 204 of the features 214 input into the neural network 218. The neural network 218 may be a recurrent neural network (RNN) or other temporal neural network configured to capture temporal dependencies of sequential operations performed by human operators as latent representations. Components of a neural network 218 may include an input layer, an output layer, and one or more hidden layers, which may be convolutional filters. The neural network 218 determines the latent representations and outputs action inferences 224 based on the input features 214 from the motion data 208 and gaze data 210.

At block 220, a low-level action transition model 222 is generated based at least in part on the temporal relationships and dependencies determined by the neural network 218 at block 216. The low-level transition model 222 transforms the high dimensional data sequences of the action inferences 224 from the neural network 218 into a lower-dimensional latent space. The transition model 222 uses transition matrices to represent pairs of actions that follow one another, thereby simplifying the modeling of potential actions. Reducing the dimensionality from the original space to the reduced space advantageously reduces computational complexity and increases computational speed and efficiency, thereby facilitating conditional predictions of human intention and enhancing the generalization ability of the system as described below in block 230.

The transition model 222 uses transition matrices to model pairs of action inferences 224 generated by the neural network 218. Positive sample data are derived from the same action or low-level intention as the intended operation of the remote robotic elements, whereas the negative sample data are from different actions. Action inferences 224 generated from the neural network 218 for the first sets of training tasks 204 are used to generate first pairs of transition data which serve as positive sample data. Action inferences 224 generated from the neural network 218 from the second sets of training tasks 204 are used to generate second pairs of transition data which serve as negative sample data.

In an embodiment, the low-level action transition model 222 may be further refined using negative data with contrastive learning in block 220. Contrastive learning may include the negative data associated with the second sequence of training tasks 204 described with regard to block 202 above. The negative data is associated with motion data 208 and gaze data 210 that is associated with sequences of tasks involving actions that are different than the operations intended to be carried out by the remote robotic device. In order for the neural network 218 to generate action inferences 224 to be used for contrastive learning, the neural network 218 may need to be able to recognize features different from those used in the performance of intended remote robotic operations. Also, it may be advantageous train the neural network 218 using a variety of different features to provide a robust inference capability, which also may increase the ability of the neural network 218 to operate as intended when new human operators perform teleoperation tasks in their own unique ways.

This implementation of contrastive learning, using both positive data and negative data, provides for improved performance of the transition model 222 over other forms of contrastive learning, such as contrastive learning using only positive data gathered from different perspectives of the same training task. By pairing positive data samples with negative data samples, the contrastive learning technique enables data corresponding to the same action to be associated with the same low-level intention and similarly represented in the system.

The transition model 222 may be designed to maximize the similarity between the positive data from different samples while minimizing the similarity between the positive data and the negative data. The low-dimensional latent space of the transition model 222 advantageously facilitates making conditional predictions about human operator intentions based on observed real-time data gathered during actual operation of the remote robotic elements, as describe below in block 230. This advantageously allows a remote robotic controller to semi-autonomously control teleoperated robotic elements during the performance of intended real-world tasks where the human operator's intentions can be determined despite potential communication delays or other communication errors.

In an embodiment, a novel adaptive contrastive loss function 226 adaptively combines cross-entropy loss with contrastive loss to quantify the agreement between the representations of positive pairs of sample data and the discrepancies between representations of positive pairs of sample data and negative pairs of sample data. Contrastive loss functions to reduce the distance between similar data points within an embedding space while simultaneously increasing the separation between dissimilar data points. Adaptive weights of both loss functions may be iteratively learned and adjusted to ensure the best learning performance of the system. The adaptive contrastive loss function 226 advantageously is able to learn slow features that preserve temporal coherence in general temporal settings.

The transition model 222 facilitates the filtering out of implausible actions sequences during inference thereby improving inference estimation accuracy. In an embodiment, the transition model 222 may include a transition rules module 228. The transition rules module 228 may include rule-based conditions and/or constraints. Constraints may be defined based on the low-level transition model 222 to include, for example, only valid sequences of actions that may be performed during the teleoperation of remote robotic elements. In an embodiment, during the action inference process in the neural network 218, the output sequences of action inferences 224 may be subject to defined constraints. If an inferred action sequence violates any predefined constraint, a new action inference result may be generated from the last layer of the model until all constraints are fully satisfied. In an online deployment scenario, constraints may be enforced in real-time when a human operator interacts with a remote teleoperated robotic system. If action inference 224 from the neural network 218 results in a sequence that contradicts, or is in violation of, one of the constraints, the system may generate a new estimation. By incorporating the low-level transition model 222 with rule-based constraints in the action inference process, the transition rules module 228 advantageously may ensure that the inferred intention aligns with expected action sequences and transitions, thereby improving the overall reliability of intention estimation throughout the entire interaction between the human operator and the remotely teleoperated robotic elements.

At block 230, a dynamic intention model 232 is generated using a hierarchical clustering discovery module 234, a Bayesian hierarchical modeling module 236, and the transition model 222. The hierarchical clustering discovery module 234 determines the intention hierarchy for each of the step-by-step procedures or operations necessary for the successful execution of tasks by remote teleoperated robotic elements. The generated intention hierarchy encompasses both low-level sub-goal execution and higher-level task objectives. Hierarchical clustering may include an unsupervised learning routine that automatically discovers the hidden structure of the intention hierarchy without requiring predefined hierarchical structures thus eliminating the need for expert knowledge. The hierarchical clustering discovery module 234 discovers the hierarchy using a dataset of intention-related features extracted from the latent representations determined by the neural network 218 in block 216. The hierarchical clustering discovery module 234 then performs agglomerative clustering based on the similarity.

In an embodiment, Ward's linkage may be used to minimize the variance of merged clusters. Ward's linkage minimized the increase in variance within clustering after merging at each step, leading to more homogenous clusters. As the agglomerative clustering proceeds, the hierarchical clustering discovery module 234 builds a hierarchical tree, such as a dendrogram, to represent the hierarchical relationship among different levels of intentions. The hierarchical clustering discovery module 234 may analyze the resulting dendrogram to establish hierarchy levels intention hierarchy, identify natural breakpoints to determine different levels of the intention hierarchy, and otherwise interpret the semantics of clusters at each level and map them to the appropriate intentions in the intention hierarchy. The hierarchical clustering discovery module 234 may group together low-level intentions to form high-level intention and therefore capture both low-level sub-goals and high-level task objectives in the determined intention hierarchy.

The Bayesian hierarchical modeling module 236 may be configured to quantify, in one or more probabilistic results, inherent uncertainty associated with the intention hierarchy determined by the hierarchical clustering discovery module 234. Inherent uncertainty in the intention hierarchy may arise, for example, from the presence of system noise and/or the variability of individual human operator behavior. In an embodiment, Markov Chain Monte Carlo (MCMC) and Variational Inference (VI) may be used to determine approximate posterior distributions associated with each level of the intention hierarchy to quantify inherent uncertainty. The quantified inherent uncertainty may be used both to reflect the confidence level of the intention hierarchy as well as individual relationships between inferred intentions.

The dynamic intention model 232 may perform maximum likelihood estimation to generate a dynamic intention model using the intention hierarchy generated by the hierarchical clustering discovery module 234 and factoring the generated probabilities of the Bayesian hierarchical modeling module 236. The resulting dynamic intention model advantageously provides improved determinations of human operator intent for controlling remote teleoperated robotic elements. Maximum likelihood estimation and Bayesian hierarchical modeling methods additionally help the dynamic intention model 232 to adapt to changes in the teleoperation environment and/or changes in human operator behavior over time.

The systems and devices described above may be operatively connected for computer communication to a network. The network can be a data network, the Internet, a wide area network (WAN) or a local area (LAN) network. The network serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Generating Intention Estimation

Figure 3:
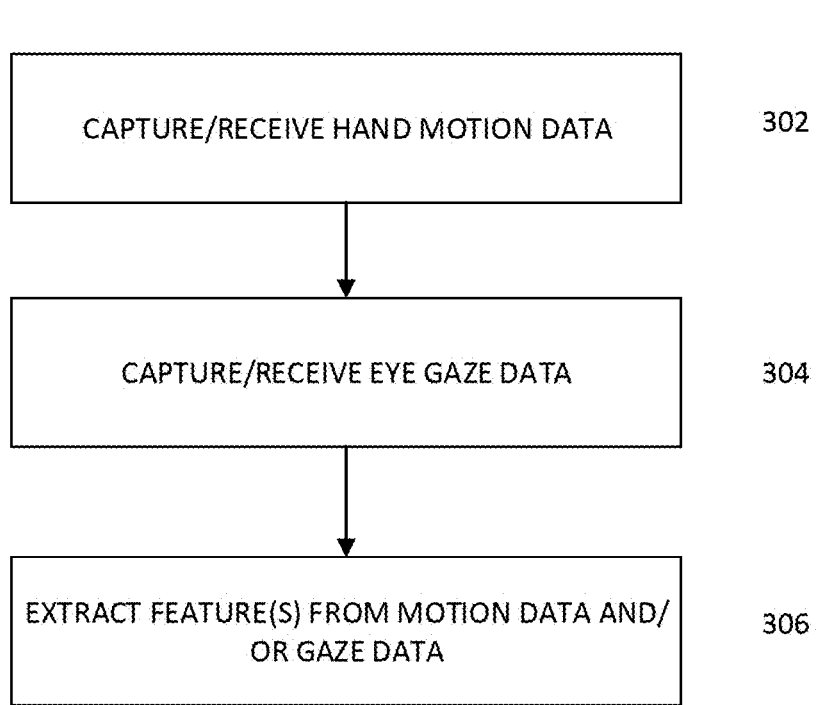
FIG. 3 is an exemplary process flow of a method for generating data for robotic teleoperation intention estimation, according to one aspect.

Referring now also to FIG. 3, a method 300 for generating data for robotic teleoperation intention estimation will now be described according to an exemplary embodiment. FIG. 3 will also be described with reference to FIGS. 1, 2, and 6-7. For simplicity, the method 300 will be described as a sequence of elements, but it is understood that the elements of the method 300 may be organized into different architectures, blocks, stages, and/or processes, for example as described with respect to FIG. 1 and FIG. 2.

At block 302, the method 300 includes a motion capture operation. A human operator controls the operation of the robotic elements to perform a task while the motion of the operator's hands are captured. At block 304, the method includes a gaze capture operation associated with the operator's eyes. The motion capture operation and gaze capture operation may use any suitable technology or technologies, such as cameras associated with video or image capture devices, accelerometers and spatial position capture devices for determining and deriving position and/or motion, as well as eyewear and other devices worn on the head of the operator that are configured to assist in capturing gaze direction and head and/or eye position and movement, etc.

In a first embodiment, the task performed by the operator may include a first set of operations associated with the intended teleoperation of a remote robotic system for which it is being trained. In a second embodiment, the task may include a second set of operations for generating a data set for contrastive learning, in which case the operations may be for a different task, the operations may be performed in an order that does not allow completion of an intended task for robotic teleoperation, or the operations may include one or more tasks designed specifically to generate data suitable for contrastive learning. In a third embodiment, the task performed by the operator may be the actual teleoperation of remote robotic elements, for example using a trained and configured system that is ready for real-world testing or operation.

At block 306, the motion data and the gaze data are preprocessed as described above for block 212. In a first embodiment, the extracted features may be used to train a neural network, for example if the human operator is performing a task that will be used to train a neutral network to recognize operations associated with performing an intended operation of remote robotic elements. In a second embodiment, the extracted features may be used to train a neural network using contrastive learning as described above. In a third embodiment, the extracted features may be used to generate intention estimation for teleoperating remote robotic elements. In each of these embodiments, the same or similar process may be used to extract features from captured motion data and gaze data. The plurality of extracted features are output to a neural network for training the neural network as described below in method 400 below, or for performing robotic teleoperation using intention estimation as describe below in method 500.

Referring now also to FIG. 4, a method 400 for robotic teleoperation intention estimation will now be described according to an exemplary embodiment. FIG. 4 will also be described with reference to FIGS. 1-3, and 5-7. For simplicity, the method 400 will be described as a sequence of elements, but it is understood that the elements of the method 400 may be organized into different architectures, blocks, stages, and/or processes.

At block 402, the method 400 includes receiving the plurality of extracted features which are input into a neural network such as a recurrent neural network (RNN). The neural network is trained to output action inferences based on the extracted features input into the neural network. Action inferences may include suitable descriptive indicia representing actions occurring in the features as well as temporal relationships and dependencies of tasks being performed in one or more features. For example, while the features input into the neural network may include data intensive video segments, audio data, motion data, and gaze data, the output of the neural network includes comparatively terse action inferences suitable for further processing. Advantageously, in addition to easily apparent actions such as hand movements from the features, the neural network may determine latent data from features that is highly predictive of the intended actions by the human operator. For example, if an operator always glances at an intended destination when initially picking up a block, it may be highly predictive that the human operator's next tasks would include moving the block to the intended destination. Therefore, a suitably trained neural network advantageously may generate action inferences that may otherwise be overlooked by preconfigured expert systems.

At block 404, the low-level action transition model is generated based at least in part on the action inferences determined by the neural network. The transition model may include one or more transition matrices that represent pairs of actions that follow each other as described above for block 220. Features used to train the neural network may include both positive data, associated with tasks intended to be performed by teleoperation of remote robotic elements, and negative data, which may be associated with other tasks or operations. Negative data is described below with regard to contrastive learning.

At block 406, contrastive learning may be used to refine the low-level action transition model. Contrastive learning may include both positive data and negative data. By using both positive data and negative data the transition model generates one or more transition matrices of sequential tasks that may not be associated with the task intended to be performed by teleoperation of remote robotic elements. By careful selection of the tasks being performed and subsequent features being extracted, contrastive learning is used to generate transition matrices of pairs of sequential tasks that are not associated with intended remote teleoperation tasks. These negative transition matrices help to suppress erroneous inferences of intended human operation, thereby increasing the likelihood that the system will make only correct inferences. An adaptive contrastive loss function, described at block 408, and rule-based conditions and/or constraints, described at block 410, also may be optionally implemented to reduce or prevent erroneous inferences of intended human operation.

At block 408, an adaptive contrastive loss function may be optionally implemented with the transition model to reduce or prevent erroneous inferences of intended human operation. The adaptive contrastive loss function combines cross-entropy loss with contrastive loss to quantify the agreement between the representations of positive pairs of block 404 and discrepancies between representations of positive and negative pairs described in block 406. Adaptive weights of both cross-entropy loss and contrastive loss may be iteratively learned and adjusted to ensure the best learning performance with the transition model.

At block 410, the transition model can limit the creation of transition matrices, or remove existing transition matrices, using rule-based conditions and/or constraints. Example constraints may include limiting elements in the transition matrices to only those pairs of action inferences necessary to carry out intended teleoperation of remote robotic devices. Example rules may include filters that prevent or remove transition matrices found to have implausible action sequences. Rules, constraints, adaptive contrastive loss functions, and contrastive learning, individually or in combination, help to improve inference estimation accuracy and ensure that the inferred intention aligns with expected action sequences and transitions.

At block 412, hierarchical clustering discovery may be used to determine the intention hierarchy of operations associated with teleoperation of remote robotic elements. As described above with regard to block 230, the hierarchical clustering discovery algorithm may be a learning routine that automatically discovers the hidden structure of human operator intention. The hierarchical clustering algorithm uses agglomerative clustering of those action inferences output by the recurrent neural network of block 402 that are associated only with the teleoperation of the remote robotic elements. Ward's linkage may be used to minimize any increase in variance within clustering after merging at each step, leading to more homogenous clusters. The hierarchical clustering algorithm builds a hierarchical tree, such as a dendrogram, to represent the hierarchical relationship among different levels of intentions. The hierarchical clustering algorithm advantageously may group together low-level intentions to form high-level intentions and therefore capture both low-level sub-goals and high-level task objectives in the determined intention hierarchy.

At block 414, Bayesian hierarchical modeling may be used to quantify uncertainty associated with the determined intention hierarchy of block 412. Markov Chain Monte Carlo (MCMC) and Variational Inference (VI) may be used to determine and quantify uncertainty to probabilistic values, as further described above in block 230.

At block 416, a maximum likelihood estimation may be performed to generate a dynamic intention model by factoring in the generated probabilities from the Bayesian hierarchical modeling at block 414 with the intention hierarchy generated at block 412.

At block 418, a suitable human intention output can be generated from the transition model, the intention hierarchy, and the maximum likelihood estimation. The human intention output can be used by remote teleoperated robotic elements to control the operation of robotic elements as described below with regard to method 500.

Referring now also to FIG. 5, a method 500 for performing robotic teleoperation using intention estimation will now be described according to an exemplary embodiment. FIG. 5 will also be described with reference to FIGS. 1-4, and 6-7. For simplicity, method 500 will be described as a sequence of elements, but it is understood that the elements of the method 500 may be organized into different architectures, blocks, stages, and/or processes.

At block 502, for each teleoperation performed by a human, features are extracted similar to the operations performed in blocks 302 through block 306.

At block 504, for each performed teleoperation, extracted features are input into the trained neural network, for example the recurrent neural network described above with regard to block 402. The trained neural network generates action inferences based on the extracted features.

At block 506, the transition model compares the action inferences with stored elements in the transition matrices, the transition model and transition matrices having been modeled in blocks 404 and optionally in blocks 406, 408, and 410.

At block 508, if the determined action inference corresponds to data in one or more of the transition matrices, a check is performed with the intention hierarchy described above with regard to block 412, and a maximum likelihood estimation is determined as described above with regard to block 416.

At block 510, based on the results of the check with the intention hierarchy and maximum likelihood estimation, a human intention output may be conditionally sent to operate the robotic elements. In an embodiment, the human intention output may be sent as a control signal to the robotic elements in the absence of direct control signals from the human operator. For example, a control signal corresponding to the determined human intention may be output if communications are determined to be temporarily interrupted or delayed due to network issues. This may be further conditioned based on a variety of available information, such as how time critical the particular robotic operation is, an estimation of any risk in performing the particular robotic operation without direct human control, a threshold value of maximum likelihood estimation being met or exceeded (for example a 95% confidence level,) prior authorization granted by the human operator, or any other suitable criteria or combinations of criteria.

In an embodiment, the human intention output may be use to refine the operation of the robotic elements in combination with one or more control signals received from the human operator that is teleoperating the robotic elements. For example, if due to positioning error or time delays the intended operation of the human operator would not be successful, or if the intended operation could be performed with a threshold measure of improvement or likelihood of success, control of the robotic elements may be augmented using the human intention output to prevent operator failure or improve the intended operation by the human operator teleoperating the robotic elements.

In an embodiment, the human intention output may be a control signal transmitted to a robotic controller that controls the robotic elements. In an embodiment, the robotic controller may perform some, or all of, the operations described in blocks 502 through block 508. In an embodiment, the robotic controller can be integrated with the robotic elements. In an embodiment, the human intention output can include indicia corresponding to the human intention output or any other related data including, but not limited to, the likelihood estimation determined in block 508.

Figure 6:
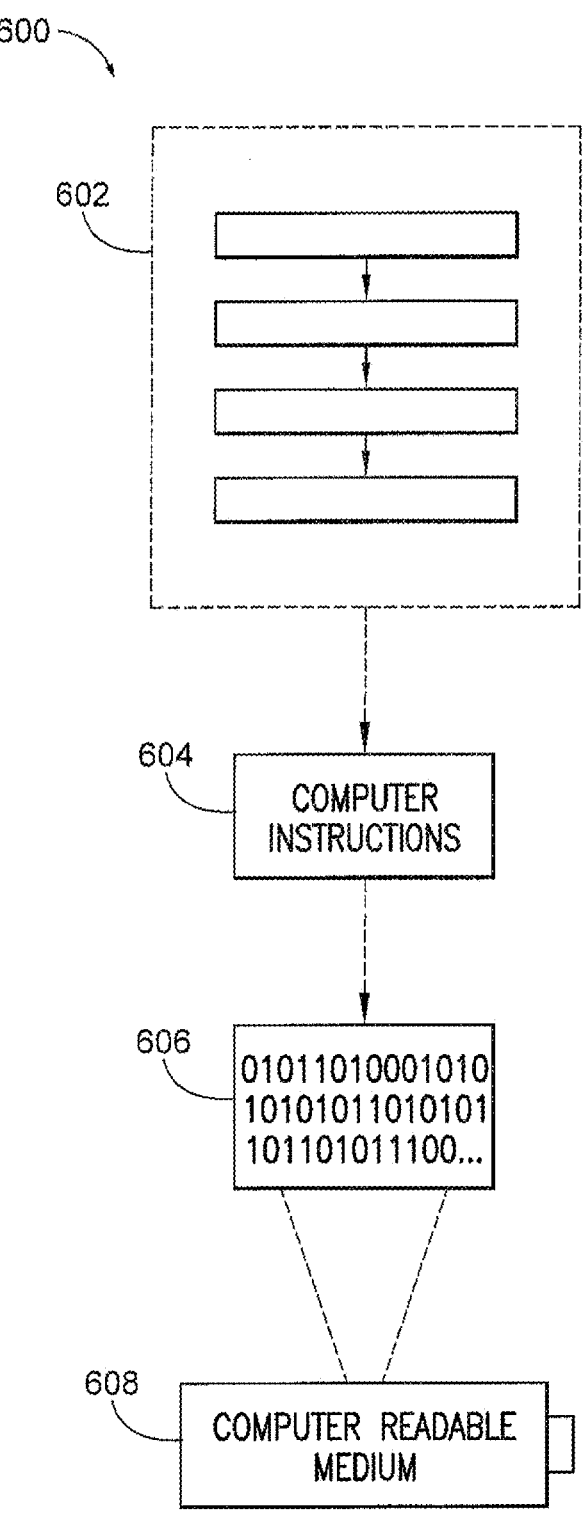
FIG. 6 is an illustration of an example computer-readable medium or computer-readable device including processor-executable instructions configured to embody one or more of the provisions set forth herein, according to one aspect.

Referring now also to FIG. 6, in another aspect a computer-readable medium including processor-executable instructions configured to implement one aspect of the techniques presented herein. An aspect of a computer-readable medium or a computer-readable device devised in these ways is illustrated wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In this implementation 600, the processor-executable computer instructions 604 may be configured to perform a method 602, such as the method 300 of FIG. 3 and/or the method 400 of FIG. 4. In another aspect, the processor-executable computer instructions 604 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
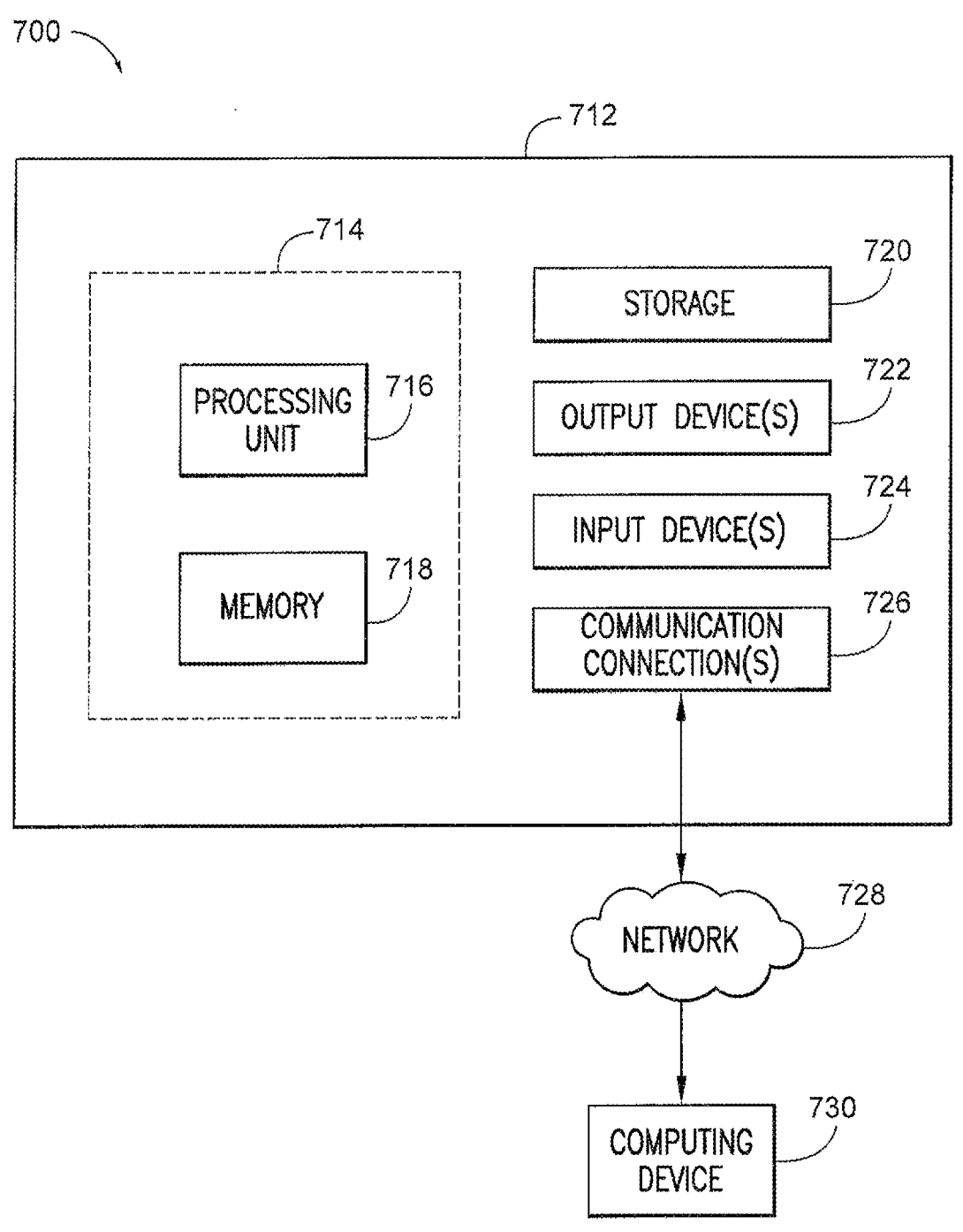
FIG. 7 is an illustration of an example computing environment where one or more of the provisions set forth herein are implemented, according to one aspect.

FIG. 7 and the following discussion provide a description of a suitable computing environment to implement aspects of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, embedded processors or controllers, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including an apparatus 712 configured to implement one aspect provided herein. In one configuration, the apparatus 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other aspects, the apparatus 712 includes additional features or functionality. For example, the apparatus 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 712. Any such computer storage media is part of the apparatus 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 712 includes input device(s) 724 such as keyboard, mouse, pen, voice input device, touch input device, infrared cameras, video input devices, or any other input device. Output device(s) 722 such as one or more displays, speakers, printers, or any other output device may be included with the apparatus 712. Input device(s) 724 and output device(s) 722 may be connected to the apparatus 712 via a wired connection, wireless connection, or any combination thereof. In one aspect, an input device or an output device from another computing device may be used as input device(s) 724 or output device(s) 722 for the apparatus 712. The apparatus 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for robotic teleoperation, comprising:
a robotic teleoperation input configured to:
   receive a plurality of motion inputs of a human operator while performing a robotic teleoperation task, and
   receive a plurality of gaze data of the human operator while performing the robotic teleoperation task;
a robotic teleoperation feature extractor configured to:
   analyze the motion inputs and the gaze data associatively, and
   extract a plurality of features from the motion inputs and the gaze data;
a robotic teleoperation neural network configured to:
   determine a plurality of latent actions, each associated with one or more extracted features, and
   generate a plurality of temporally associated action inferences, each action inference being associated with a determined latent action and associated extracted features;
a robotic teleoperation transition model configured to:
   determine elements of a transition matrix associated with a sequenced pair of action inferences;
a robotic teleoperation dynamic transition model configured to:
   determine an inferred intention associated with the determined elements of the transition matrix,
   wherein the dynamic transition model includes an intention hierarchy associated with a plurality of inferred intentions, and
   wherein the inferred intention is based at least in part on an estimated probabilistic uncertainty applied to the intention hierarchy; and a teleoperated robotic element that performs a task associated with the inferred intention without a corresponding control signal from the human operator.

2. The system of claim 1, wherein the robotic teleoperation neural network is further configured to train a recurrent neural network with the extracted features.

3. The system of claim 1, wherein the robotic teleoperation transition model generates one or more transition matrices associated with one or more sequenced pairs of action inferences.

4. The system of claim 3, wherein the robotic teleoperation transition model is refined using contrastive learning when a sequenced pair of action inferences is not associated with an intended teleoperation of a robotic element.

5. The system of claim 3, wherein the robotic teleoperation transition model performs a contrastive loss function to generate weights associated with one or more transition matrices and applies a conditional rule to a transition matrix to redetermine at least one action inference associated with the transition matrix.

6. The system of claim 1, wherein the robotic teleoperation dynamic transition model is further configured to:

perform hierarchy discovery using a hierarchical clustering algorithm to generate an intention hierarchy from action inferences;

estimate probabilistic uncertainty of at least a part of the intention hierarchy uncertainty using Bayesian hierarchical modeling; and generate a likelihood estimation of an inferred intention based on the estimated probabilistic uncertainty applied to the intention hierarchy.

7. The system of claim 6, wherein the hierarchical clustering algorithm includes a Ward's linkage algorithm, and wherein Bayesian hierarchical modeling includes one or more of a Markov Chain Monte Carlo and a Variational Inference algorithm.

8. A method for robotic teleoperation, comprising:

receiving a plurality of gaze data and a plurality of motion inputs associated with a human operator performing a robotic teleoperation task;

extracting a plurality of features from the motion inputs and the gaze data;

determining, by a neural network, a plurality of latent actions, each associated with one or more extracted features;

generating, by the neural network, a plurality of temporally associated action inferences, each action inference being associated with a determined latent action and associated extracted features;

determining elements of a transition matrix associated with a sequenced pair of action inferences;

determining, using a dynamic transition model, an inferred intention associated with the determined elements of the transition matrix, wherein the dynamic transition model includes an intention hierarchy associated with a plurality of inferred intentions, and wherein the inferred intention is based at least in part on an estimated probabilistic uncertainty applied to the intention hierarchy; and performing, by a teleoperated robotic element, a task associated with the inferred intention without a corresponding control signal from the human operator.

9. The method of claim 8, wherein neural network is a recurrent neural network and further comprising:

training the recurrent neural network with the extracted features.

10. The method of claim 8, further comprising:

generating one or more transition matrices associated with one or more sequenced pairs of action inferences.

11. The method of claim 10, further comprising:

refining the robotic teleoperation transition model using contrastive learning when a sequenced pair of action inferences is not associated with an intended teleoperation of a robotic element.

12. The method of claim 10, further comprising:

performing a contrastive loss function to generate weights associated with one or more transition matrices; and applying a conditional rule to a transition matrix to redetermine at least one action inference associated with the transition matrix.

13. The method of claim 8, further comprising:

performing hierarchy discovery using a hierarchical clustering algorithm to generate an intention hierarchy from action inferences;

estimating probabilistic uncertainty of at least a part of the intention hierarchy uncertainty using Bayesian hierarchical modeling; and generating a likelihood estimation of an inferred intention based on the estimated probabilistic uncertainty applied to the intention hierarchy.

14. The method of claim 13, wherein the hierarchical clustering algorithm includes a Ward's linkage algorithm, and wherein Bayesian hierarchical modeling includes one or more of a Markov Chain Monte Carlo and a Variational Inference algorithm.

15. A non-transitory computer readable storage medium storing instructions that when executed by a computer having a processor to perform a method for robotic teleoperation, the method comprising:

receiving a plurality of gaze data and a plurality of motion inputs associated with a human operator performing a robotic teleoperation task;

extracting a plurality of features from the motion inputs and the gaze data;

determining, by a neural network, a plurality of latent actions, each associated with one or more extracted features;

generating, by the neural network, a plurality of temporally associated action inferences, each action inference being associated with a determined latent action and associated extracted features;

determining elements of a transition matrix associated with a sequenced pair of action inferences;

determining, using a dynamic transition model, an inferred intention associated with the determined elements of the transition matrix, wherein the dynamic transition model includes an intention hierarchy associated with a plurality of inferred intentions, and wherein the inferred intention is based at least in part on an estimated probabilistic uncertainty applied to the intention hierarchy; and performing, by a teleoperated robotic element, a task associated with the inferred intention without a corresponding control signal from the human operator.

16. The non-transitory computer readable storage medium of claim 15, wherein neural network is a recurrent neural network and further comprising:

training the recurrent neural network with the extracted features.

17. The non-transitory computer readable storage medium of claim 15, further comprising:

generating one or more transition matrices associated with one or more sequenced pairs of action inferences.

18. The non-transitory computer readable storage medium of claim 17, further comprising:

refining the robotic teleoperation transition model using contrastive learning when a sequenced pair of action inferences is not associated with an intended teleoperation of a robotic element.

19. The non-transitory computer readable storage medium of claim 17, further comprising:

performing a contrastive loss function to generate weights associated with one or more transition matrices; and applying a conditional rule to a transition matrix to redetermine at least one action inference associated with the transition matrix.

20. The non-transitory computer readable storage medium of claim 15, further comprising:

performing hierarchy discovery using a hierarchical clustering algorithm to generate an intention hierarchy from action inferences;

estimating probabilistic uncertainty of at least a part of the intention hierarchy uncertainty using Bayesian hierarchical modeling; and generating a likelihood estimation of an inferred intention based on the estimated probabilistic uncertainty applied to the intention hierarchy.

\* \* \* \* \*